United States Patent [19]

Tavazza et al.

[11] Patent Number: 4,502,521

[45] Date of Patent: Mar. 5, 1985

[54] MOUNTING-RIM FOR TIRES AND ITS ASSEMBLY WITH CORRESPONDING TIRE

[75] Inventors: Giuseppe Tavazza, Milan; Maurizio Boiocchi, Segrate, both of Italy

[73] Assignee: Societa Pneumatici Pirelli S.p.A., Milan, Italy

[21] Appl. No.: 480,329

[22] Filed: Mar. 30, 1983

[30] Foreign Application Priority Data

Mar. 31, 1982 [IT] Italy ............... 20495A-82

[51] Int. Cl.³ .............................. B60B 25/12
[52] U.S. Cl. ...................... 152/381.4; 152/375; 152/379.5
[58] Field of Search ............ 152/375, 379.3, 381.3, 152/381.4, 379.4, 379.5, 330 RF; 301/95, 96, 97, 98

[56] References Cited

U.S. PATENT DOCUMENTS

| 2,948,568 | 8/1960 | Hykes et al. ............ 301/97 X |
| 3,977,727 | 8/1976 | Glasenapp et al. ......... 301/97 |
| 4,246,950 | 10/1979 | Welter et al. ............ 152/381.4 |
| 4,351,382 | 9/1982 | Corner et al. ............ 152/381.4 |

Primary Examiner—David A. Scherbel
Assistant Examiner—Russell D. Stormer
Attorney, Agent, or Firm—Stevens, Davis, Miller & Mosher

[57] ABSTRACT

The device is composed of a series of two or more substantially circular protuberances that are eccentric with respect to the rim axis, and formed on the mounting rim in an axially inner position with respect to the bead seat, creating a confining space adjacent the bead seat and radially outwardly projecting with respect to it, so as to constitute a limit to the axial shifting of the tire bead heel towards the central well of the rim.

9 Claims, 7 Drawing Figures

MOUNTING-RIM FOR TIRES AND ITS ASSEMBLY WITH CORRESPONDING TIRE

BACKGROUND OF THE INVENTION

The present invention concerns mounting rims for tires, as well as the complete tire-rim assembly, and in particular, it concerns rims provided with devices to prevent unseating of the bead.

It is already known that when a vehicle is cornering, there is a force acting upon the tire sidewalls, in a direction substantially parallel to the wheel axis, the intensity of which varies depending upon the radius of curvature of the cornering and the speed of the vehicle.

This cornering force acts so as to shift the outboard tire bead from its seat on the mounting rim towards the axially inner zone of the rim, and it is resisted, to a large extent, by the inflation pressure of the tire. When the tire is at least partially deflated, for each value of this force there exists a well-determined pressure value (lower than that of normal inflation pressure), for which value the tire bead heel shifts effectively from its normal seat on the mounting rim axially inwardly to then drop into the central well of the rim, which is usually located along the meridian plane of the rim. When this takes place, the consequence is usually a loss of control of the vehicle by the driver.

For this reason, the problem of impeding the shifting of the bead heal was always important, but has become even more important after improvements made in the state of the roads, and also due to the improved performance of vehicles, that has allowed for even greater traveling speeds.

For this purpose, there are many prior art devices intended to block the bead heel upon the rim to prevent axial shifting. Among these devices are those that are more generally adopted to consist of a particular shaping, better known as "hump", formed on the rim in the proximity of the axially inner extremity of the bead seat, and extending radially outwardly for a constant height with respect to the seat of the bead heel, which is intended to constitute an insurmountable obstacle to the axial shifting movement of the tire bead.

However, this hump must be straddled by the bead heel of the tire during the step of mounting the tire onto the rim, and this mounting is done with a force that is less than that applied to the wheel when driving under cornering conditions.

It results from this, that the radial height of the hump, with respect to the bead seat surface, cannot exceed determined limits. In fact, if the height of this hump is raised so as positively to block the bead heel on the tire rim (under the above-mentioned critical conditions), the result is that the tire could not be mounted onto the rim.

The height of this hump is such as to allow it to be passed over by the tire bead heel during its mounting upon the rim by taking advantage of the deformability of the metallic bead core (which is circumferentially inextensible, but rather flexible, so much so that it can assume an elliptical configuration) and the compressibility of the elastomeric material that covers the radially inner surface of the metallic bead core.

From this there results a compromise, characterized by a certain difficulty in mounting the tire, but with a corresponding sealing capacity of the rim with respect to the tire bead heel in the instance of a partially deflated tire during cornering, up to about 60% of the value of the normal inflation.

In attempts to improve this situation, there have been proposed rims having an asymmetrical hump. In other words, the height of this hump is at a maximum at a point corresponding to a determined zone of the tire bead passing gradually from the minimum value to the maximum value and vice versa, along a certain portion of its perimeters.

In actual practice, even the above-mentioned variant has not completely solved the problem. In fact, if the increase in the height of the hump along one portion of the periphery of the bead seat is carried out at the expense of having a corresponding reduction of this height along the diametrical opposite portion, so as to keep constant the circumference of the hump, with regard to the ability to mount the tire onto the rim, no advantage is had; whereas, as far as concerns resistance to bead unseating, the behavior of the rim is decidedly worsened in the portion of diminished height.

If this greater height is obtained by increasing the height of the previous symmetrical hump along a portion of its development and, consequently, by also increasing its maximum circumference, the gain, with regard to resistance to the bead's unseating, is quite costly because of the considerable increase in difficulty in mounting of the tire.

The applicant has now discovered a new way of forming these humps, on the basis of which it is possible to make a mounting rim for tires that presents simultaneously a greater ease in mounting the tire and a greater sealing ability for the tire bead in its normal seat during cornering under partially deflated tire conditions.

It is thus a first object of the present invention to form a supporting rim for tires comprising a pair of bead seats on the rim, each one connected at its axially outer extremity to a radially outwardly extending flange, at least one of said bead seats being also connected, at its axially inner extremity, to a radially outwardly extending protuberance means, said rim being characterized by the fact that said protuberance means comprises at least two circumferentially raised protuberances that are substantially continuous and axially side-by-side, each protuberance lying on a plane perpendicular to the rim axis and presenting a cross-section that is substantially circular, the center of said section being eccentric with respect to the axis of said rim, the centers of said distinct sections being destributed around the circumference of said rim, the radius of said circular section being not greater than 2% larger than the radius of said bead seat, measured along a line between that proturberance and the adjacent seat, on said axially inner extremity.

According to certain preferred embodiments, the above-mentioned protuberance means can comprise two or even three or four circumferential protuberances, with the centers of the corresponding cross-sections symmetrically disposed around the circumference of the rim. Moreover, between two successive protuberances, there is preferrably a substantially cylindrical coupling surface.

Beside this, quite conveniently, the outer profiles of said protuberances, as seen in cross-section along a plane passing through and parallel to the rim axis, are variable along the circumference of the rim, in particular, to permit the radial height of the protuberance (especially the one that is axially outermost) to be the same as that of the surface of the bead seat at a point on its circumference, and without this giving rise to any reduction in the thickness of the body of the rim in the zones that are immediately adjacent to said point.

A second object of the present invention is a complete tire-rim assembly formed with a rim according to the above-stated first object, wherein the circumference of those protuberances is not greater than the inner circumference of the bead cores in the tire bead. Moreover, in said assembly, the maximum height of said circumferential protuberances, with respect to the bead seat, extends radially outwardly no further than the radially innermost point of the bead core on the bead of the corresponding tire when mounted on the rim and inflated to normal inflation pressure for that tire.

BRIEF DESCRIPTION OF THE DRAWINGS

In any case, the present invention will be better understood with the aid of the following description and the attached drawings which are given by way of example and not of limitation, wherein.

DETAILED DESCRIPTION OF THE PREFERRED EMBODIMENTS

Figure 1:
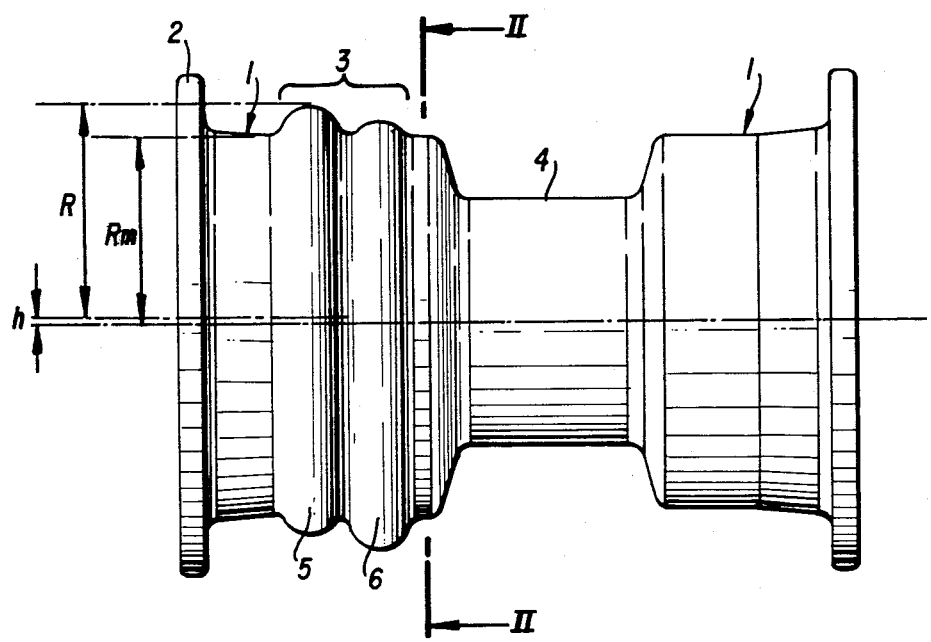
FIG. 1 is an elevational view of a first embodiment of the tire rim of this invention.

With reference to FIG. 1, the rim comprises, referring to its two axial outer portions, a bead seat 1, which connects, at its axially outer portion, with a radially outwardly extending flange 2, usually known as a rim flange, that serves for supporting axially, from outside, the bead heel of the tire carcass casing which, when the tire is inflated, comes into tight contact with said flange, as is well known and also illustrated in the successive figures.

The rim bead seat 1 may have no taper, that is, be parallel with the axis of rotation. However, it is usual that the bead seat 1 is tapered, that is, at an angle of inclination with respect to the axis of rotation. A wide variety of bead seat tapers may be used, usually lying between 5° and 15° with respect to the axis of rotation. In a preferred embodiment of this invention, the bead seat is so tapered and, when reference is made in this specification to a line drawn through the bead seat, it is intended that such a line would contact a tapered bead seat at its axial inner extremity which, of course, is the point of minimum diameter of a tapered bead seat. Similarly, if the bead seat has no taper, then that line would be an extension of the entire bead seat surface.

Referring now to the axially inner extremity of the bead seats, at least one of these bead seats, and preferably both of them, is connected to protuberance means 3 that also projects radially outwardly.

This protuberance means is then connected with the central well or drop center 4 that occupies a central position with respect to the axial width of the rim.

Figure 2:
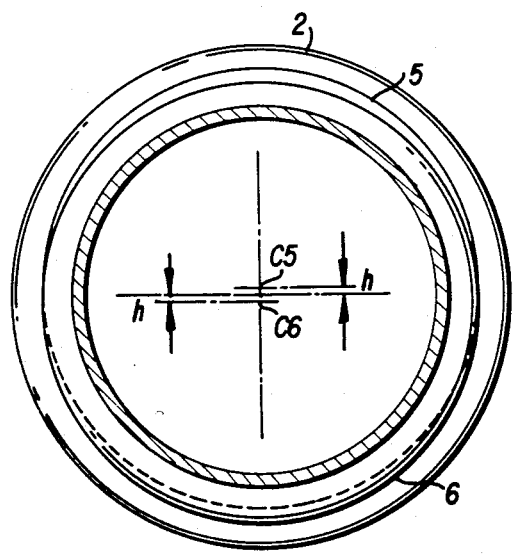
FIG. 2 is a cross-sectional view taken along line II—II of FIG. 1, which is perpendicular to the axis of rotation.

The protuberance means 3, in a first embodiment, has two circumferential protuberances 5 and 6, that are axially side-by-side but are not coaxial with the rotational axis of the rim, but instead have their respective centers C-5 and C-6, radially spaced from said rotational axis and preferably disposed in a symmetrical manner, at a distance "h" from the rotational axis (as can be seen in FIG. 2).

The height h will be called eccentricity of the outline and its value depends upon the circumferential development desired to be given to the protuberance and further depends upon the minimum height of said protuberance with respect to the axial inner extremity of the bead seat.

The circumferential development of these protuberances is a little greater than the circumferential development of the bead seat, measured to a line parallel to the axis of rotation and extending between the bead seat and the protuberance 3; we shall call the radius of the rim, measured to this line, "minimum radius (Rm)" of the rim (see FIG. 1).

The maximum radius R of each protuberance, measured to its radially outer surface, must not be more than 2% greater than Rm of the rim.

In practice, let us consider a distance, which we shall call H, measured between the radially innermost point of the tire bead core (FIG. 3) and the radially outer surface of the bead seat of the corresponding rim, measured along plane r, which is perpendicular to the axis of rotation of the mounting rim. The radius of the protuberance, measured with respect to the axis of the mounting rim, corresponds with a point situated at about 50% of H.

In any case, the radius of the protuberances can never be greater than the radius of the radially inner surface of the bead core of the tire to be mounted thereon.

Figure 3:
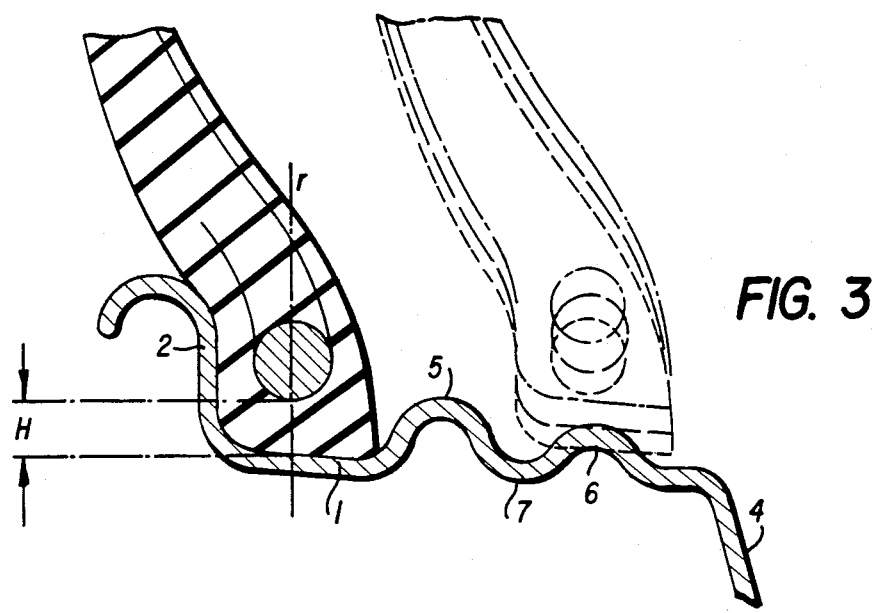
FIG. 3 is an axial cross-section of a bead seat of a second embodiment.

It is therefore clear that, even with the maximum possible eccentricity, i.e., that which annuls at a point of the circumference of the bead seat, the radial height of the protuberance with respect to said point, the corresponding maximum radius of the protuberance in the diametrically opposed position, will never present any interference with the bead core of the corresponding bead heel. The utility of this provision will appear clearer further on in the text. FIG. 3 illustrates in a cross-section, only the portion of the rim corresponding to the bead seat, in a second embodiment of the mounting rim. According to this version, between the two protuberances 5 and 6, there is interposed a substantially cyclindrical coupling zone 7 having a radius equal to Rm.

It is clear that the increase in the axial length of the portion of the rim between flange 2 and central well rim 4, increases also the possible number of protuberances and also the coupling zones that can be placed on that portion of the rim.

Figure 4:
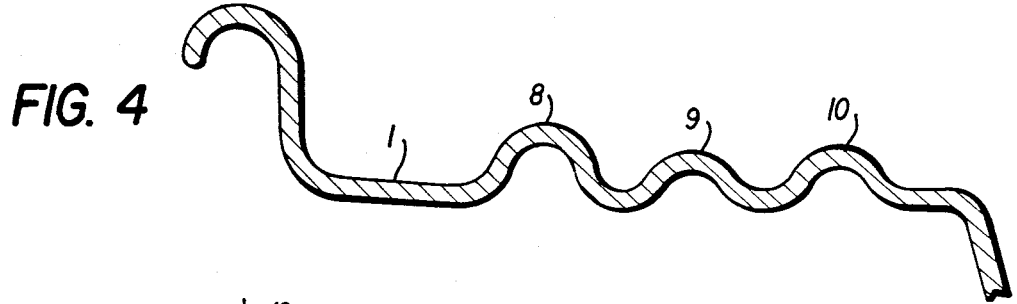
FIG. 4 is a cross-sectional view, similar to FIG. 3, of a third embodiment.
Figure 5:
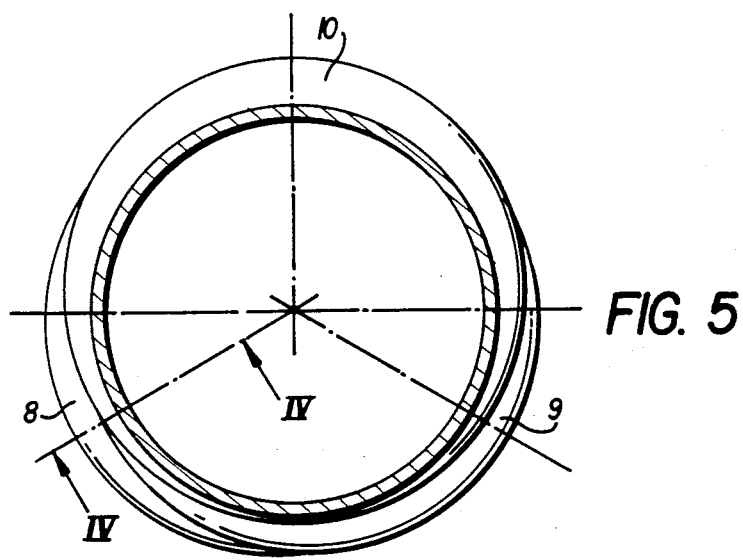
FIG. 5 is a cross-sectional view similar to FIG. 2, of the embodiment of FIG. 4.

FIG. 4 illustrates another version of the mounting rim (cross-section of the bead seat) according to which the protuberances may be three in number, that is protuberances 8, 9 and 10; the cross-section illustrated is along plane IV—IV of FIG. 5.

The circumferential protuberances are disposed with their eccentricities symmetrically disposed about the rim periphery with a spacing of 120° with respect to each other. As viewed in plane IV—IV, one of the three protuberances 8 presents its maximum radial extension with respect to the bead seat in that plane; the other two protuberances 9 and 10 present identical radial extensions but at different points around the rim periphery and consequently in different planes.

It is clear, moreover, that the curvature of the protuberances must vary along the circumference of the rim, in such a way that no reduction in thickness occurs in the zone of the rim body where the protuberance is minimum or nil, since this would lead to a consequent weakening as with respect to the thickness of the rim in the other zones adjacent to it, such as, for example, with respect to the adjacent bead seat.

Figure 6:
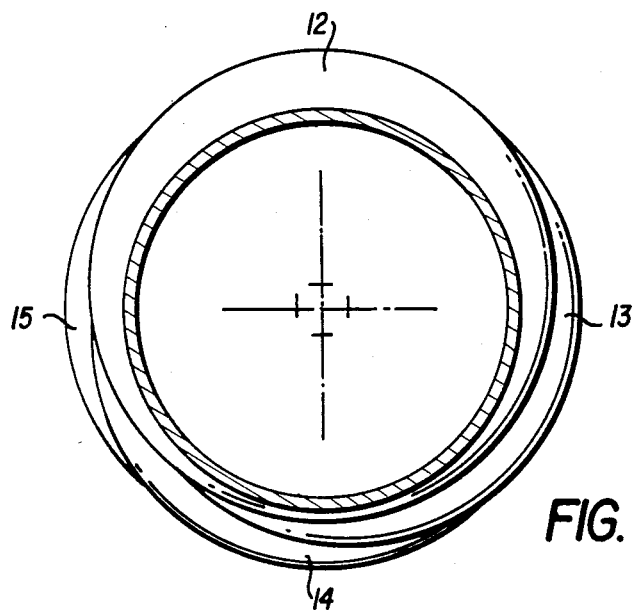
FIG. 6 is a cross-sectional view similar to FIG. 2, showing a fourth embodiment.

From the profiles of the protuberances illustrated until now, FIG. 6 can be readily understood to show, in a cross-section perpendicular to the axis, a rim provided with a shape having four circumferential protuberances 12, 13, 14 and 15, which have also their eccentricity symmetrically distributed, this time at intervals of 90° from one another, around the axis of the rim.

The rim according to the invention has proved to bring about a really substantial improvement in a solution to the problem of bead unseating in a tire, making it possible to consider the problem as almost being solved under the present invention.

In fact, with the rims of this invention, bead unseating only takes place (under severe testing conditions, which are so extreme that the average driver never encounters them) when the tire inflation is so low that, in such a case, the rim flange touches the road surface itself, thus greatly inhibiting the rolling ability of the wheel upon the road and the performance of the vehicle in general; so much so that the tire behavior is no longer influential over the general performance of the vehicle.

In other words, so long as the wheel-road contact is maintained exclusively through the tire, the tire bead will be retained in the rim.

All of the foregoing advantages are achieved without deteriorating the tire behavior or the step of mounting the tire onto the rim; in fact, the opposite is true, the mounting operation is even easier.

Figure 7:
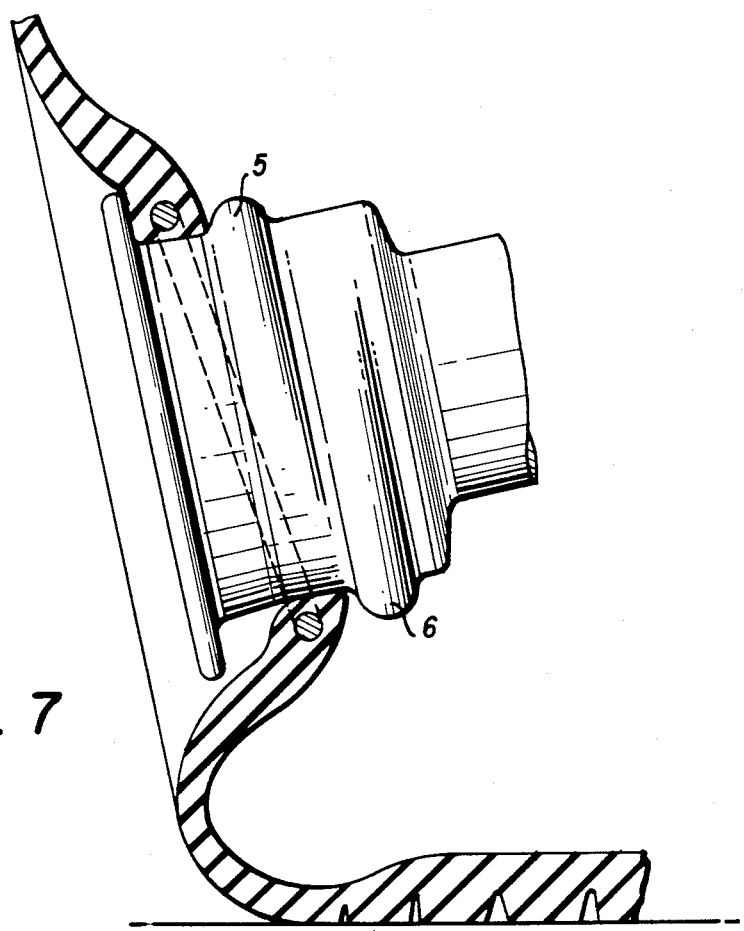
FIG. 7 is a partial cross-sectional view showing a tire rim assembly under extreme cornering conditions, to the extent of losing stability due to "breaking away".

To explain the effects of the invention in relation to the problem faced, applicant makes reference to FIG. 7 that illustrates, in a partial sectional view, the behavior of the tire wheel which is most stressed when cornering a car, usually the inboard front wheel.

It has already been said that under these conditions, the tire's bead is subjected to a force directed towards the center of the curvature of the cornering, which tends to shift the outer bead of the tire carcass casing axially, towards the inside of the rim.

The prior art devices have tried to prevent this axial shifting of the bead, but realized that the height of the blocking device could not exceed determined limits (to allow the fitting of the tire upon the rim). In practice what happened was that the above-mentioned axial force could reach such values as to cause the tire bead to ride over the limit stop, after which the now freed to move bead would continue its axial shifting towards the inside of the mounting rim, inevitably ending up by falling into the central well and thus causing an immediate loss of control of the vehicle itself.

In the rim according to the invention, the two functions relative to the ability to mount the tire and the sealing of the bead are completely separate. In fact, the ability to mount the tire is assured by the circumferential development of each protuberance, while the sealing of the bead is assured by the number and by the disposition of the above-said protuberances.

Referring now to the facility to mount the carcass casing onto the rim, it must be remembered that the radius of the protuberances is always lower than that of the inner radius of the reinforcing bead core of the tire bead, which is (as is already known) circumferentially inextensible. Attention must also be given to the fact that, during the step of fitting the tire onto the mounting rim, the shifting of the tire bead is axial. In other words, the bead substantially surmounts the protuberance simultaneously along the entire circumference, a thing which is not only possible but also easy to do with the rim of the invention, owing to the fact that the circumference of the protuberance is smaller than the inner circumference of the inextensible annular reinforcement, that is, the bead core itself.

In practice, only a partial compression is required of the elastomeric material interposed between the external surface of the bead and the metallic bead core.

It is very true that these protuberances are at least two in number and do not have the same axis, but, considering the flexibility of the tire sidewall, it can easily be seen that overcoming the successive protuberance can easily take place, as even for the first protuberance encountered, through a simple radial oscillation of the tire bead while in the plane perpendicular to the rim axis and which contains the tire's bead core, the right hand illustration in FIG. 3, where it is pointed out the three diverse positions assumable by the carcass bead in the same plane orthogonal to the rim axis, that is: on the bead seat (broken line), in overcoming the first protuberance (full line), in overcoming the second protuberance (dotted line).

When facing instead the problem of the bead unseating during tire use, it must be considered that the axial force acting on the bead is not applied simultaneously to the entire circumference of the bead, but only in a limited arc (about 50%) corresponding to the ground contact area. It results from this, that only in this arc of the circumference, is the bead heel subjected to axial shifting.

FIG. 7 illustrates a rim of the type shown in FIG. 1, whereby the minimum height of the circumferential protuberance is zero with respect to the bead seat, thus resulting in a cylindrical portion of surface adjacent the bead seat being occupied by the bead of a tire mounted on a vehicle that is engaged in cornering at high speed and low inflation pressure.

Supposing that the flat part of the axially outermost protuberance is at a location in corresponding to the ground contact area, the result is that the corresponding bead portion can effectively shift on the rim over a small arc, but soon the bead encounters the second protuberance which, at this point, presents its maximum radial projection, so much so that any further shifting is blocked. Evidently, in the diametrically opposed position, even the first shifting is blocked by the radial projection of the first protuberance, which is at a maximum value in this zone.

It is clear that the most critical zones are those in which none of the protuberances reach the maximum radial projection with respect to the bead seat, but, nevertheless, all the protuberances do have a certain height, although less than the maximum height.

It must, however, be observed that these zones first and foremost, occupy a limited arc of the circumference, in relation to the total cricumference contacted by the bead, and in the second place, in increasing the number of the protuberances, even the maximum height of these protuberances, in the critical zones, increases progressively, other factors being equal.

Attention must also be given to the very important fact that the total effect of the two (or more) axially side-by-side protuberances, is greater than the simple sum total of the effects of each protuberances.

In fact, it has already been stated and also illustrated in FIG. 7, that at the point of minimum height of the protuberance (preferably at height zero, as in FIG. 7), an axial shifting of the bead is permitted.

This shifting inclines the plane upon which lies the metallic bead core (of the corresponding bead) with respect to the rim axis, so that, in order for the bead to pass over the protuberance, there must be an increase in the circumference of the bead which is greater than that required when the bead core lies on the plane orthogonal to the rim axis.

Recalling that the annular bear core, generally metallic, is practically inextensible, it is clear here, in this instance, that the surmounting of the circumferential protuberance by the bead is even more efficaciously impeded, or else, other conditions being equal, it may be possible to diminish the radius of the protuberance, thus increasing the ability to fit the tire over the mounting rim.

The complete flattening of the protuberance in a given zone of the rim, also offers a further advantage because, when that zone leaves the ground contact area, for going into a diametrically opposed position, where the counteracting force directed axially outwardly depends only upon the (reduced) inflation pressure, the return of the bead heel to its normal seat is made easier. This evidently is rather more difficult, if not quite impossible, when a projection of the protuberance exists, and hence, when the friction between the bead and the rim surface assumes even greater values.

In conclusion, apart from what has been stated hereabove, it must be clearly understood that the present description is made only by way of nonlimiting example, and hence, what results as also being comprised within the ambit of this patent right, are all those modifications and variations of the main idea above, that have not been expressly described, but which result can be deduced from the inventive principle.

I claim:

1. A rim for a pneumatic tire, comprising a pair of bead seats each one connected at its axially outer extremity to a radially outwardly extending flange, at least one of said bead seats being also connected, at its axially inner extremity, to a protuberance means which projects radially outwardly, wherein said protuberance means comprises at least two circumferentially raised protuberances that are substantially continuous and axially side-by-side, each protuberance lying on a plane perpendicular to the rim axis and presenting a cross-section that is substantially circular, the center of said cross-section being eccentric with respect to the axis of said rim, the centers of said distinct cross-sections being distributed around the axis of said rim, the radius of each said circular cross-section not being greater than 2% larger than the radius of said bead seat, measured along a line parallel to the rim axis and extending between said protuberance and the axially inner extremity of said bead seat.

2. A tire rim according to claim 1, in which the centers of said circular sections are symmetrically distributed around the axis of rotation of said rim.

3. A tire rim according to claim 1, in which said protuberance means comprises three circumferential protuberances, the eccentricities of which are disposed at intervals of 120° from one another, around the axis of rotation of said rim.

4. A tire rim according to claim 1, in which said protuberance means comprises four circumferential protuberances, the eccentricities of which are disposed at intervals of 90° from one another, around the axis of rotation of said rim.

5. A tire rim according to claim 1, in which, between two successive protuberances, there is a coupling surface that is substantially cylindrical.

6. A tire rim according to claim 1, in which the radius of curvature of the outer outline of said protuberance, in a cross-section along a plane containing the rim axis, is variable along the circumference of the mounting rim.

7. A tire rim according to claim 1, in which at least the radial height of the axial outermost protuberance is reduced to zero, with respect to the surface of said bead seat, at a point on its circumference.

8. A tire and wheel rim assembly having a rim according to claim 1, in which the circumference of said protuberance is not greater than the circumference inside of the bead cores in the bead of the tire.

9. A tire and wheel rim assembly comprising a rim according to claim 1, in which the maximum radial height of said circumferential protuberances with respect to the bead seat does not exceed the diameter of the radially innermost point of the bead core in the bead of said tire when mounted onto the rim and inflated to normal inflation pressure.

* * * * *